United States Patent
Nakayama et al.

(10) Patent No.: US 12,476,499 B2
(45) Date of Patent: Nov. 18, 2025

(54) STATOR CORE OF ROTATING ELECTRICAL MACHINE AND ROTATING ELECTRICAL MACHINE

(71) Applicant: HITACHI ASTEMO, LTD., Hitachinaka (JP)

(72) Inventors: Kenichi Nakayama, Hitachinaka (JP); Satoshi Yamamura, Hitachinaka (JP); Shuhei Yamashita, Hitachinaka (JP); Hiroshi Aoki, Hitachinaka (JP); Akihito Toya, Hitachinaka (JP); Mohdbasir Zulaika, Hitachinaka (JP); Hiromitsu Okamoto, Hitachinaka (JP); Zhi Jing, Hitachinaka (JP); Akira Toba, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 240 days.

(21) Appl. No.: 18/041,116

(22) PCT Filed: Jul. 16, 2021

(86) PCT No.: PCT/JP2021/026889
§ 371 (c)(1),
(2) Date: Feb. 9, 2023

(87) PCT Pub. No.: WO2022/038945
PCT Pub. Date: Feb. 24, 2022

(65) Prior Publication Data
US 2023/0268783 A1 Aug. 24, 2023

(30) Foreign Application Priority Data
Aug. 21, 2020 (JP) .................. 2020-140449

(51) Int. Cl.
*H02K 1/16* (2006.01)
*H02K 21/14* (2006.01)

(52) U.S. Cl.
CPC ............... *H02K 1/16* (2013.01); *H02K 21/14* (2013.01)

(58) Field of Classification Search
CPC .......... H02K 15/02; H02K 21/14; H02K 1/32; H02K 1/148; H02K 1/16; H02K 1/276; H02K 1/20
(Continued)

(56) References Cited

U.S. PATENT DOCUMENTS 8,648,514 B2 * 2/2014 Arita ................. H02K 9/06
310/112
2005/0067915 A1 3/2005 Ida et al.
(Continued)

FOREIGN PATENT DOCUMENTS

JP 2002-151339 A 5/2002
JP 2003-324869 A 11/2003
(Continued)

OTHER PUBLICATIONS

International Search Report with English Translation and Written Opinion dated Oct. 5, 2021 in corresponding International Application No. PCT/JP2021/026889.

Primary Examiner — Alex W Mok
(74) Attorney, Agent, or Firm — Foley & Lardner LLP

(57) ABSTRACT

Provided is a stator core of a rotating electrical machine in which a core back and teeth are formed by laminating a plurality of thin steel plates with an adhesive interposed therebetween. The stator core includes a first stator core that is formed by applying the adhesive to a first region covering the core back and the teeth between the plurality of thin steel plates, and a second stator core that is formed by applying
(Continued)

the adhesive to a second region, which has an area smaller than an area of the first region, between the plurality of thin steel plates. The first stator core is disposed at least at one end of the stator core in a laminating direction of the thin steel plates.

10 Claims, 16 Drawing Sheets

(58) Field of Classification Search
USPC .................................................. 310/216.065
See application file for complete search history.

(56) References Cited

U.S. PATENT DOCUMENTS

2011/0070108 A1* 3/2011 Arita ...................... H02K 21/44
310/46

| | | | |
|---|---|---|---|
| 2017/0297078 A1 | 10/2017 | Nishinaka | |
| 2019/0356180 A1* | 11/2019 | Nakamura | ............... H02K 3/28 |
| 2020/0108591 A1 | 4/2020 | Matsunaga et al. | |
| 2021/0057969 A1 | 2/2021 | Okudaira et al. | |
| 2022/0006336 A1 | 1/2022 | Takeda et al. | |
| 2022/0052570 A1 | 2/2022 | Takeda et al. | |

FOREIGN PATENT DOCUMENTS

| | | | |
|---|---|---|---|
| JP | 2004-111509 A | | 4/2004 |
| JP | 2013207946 A | * | 10/2013 |
| JP | 2020-061925 A | | 4/2020 |
| WO | WO-2016/071943 A1 | | 5/2016 |
| WO | WO-2019/180856 A1 | | 9/2019 |
| WO | WO-2020/129929 A1 | | 6/2020 |
| WO | WO-2020/129946 A1 | | 6/2020 |

* cited by examiner

STATOR CORE OF ROTATING ELECTRICAL MACHINE AND ROTATING ELECTRICAL MACHINE

TECHNICAL FIELD

The present invention relates to a stator core of a rotating electrical machine and a rotating electrical machine.

BACKGROUND ART

A rotating electrical machine includes a stator core formed by laminating a large number of thin steel plates. Such a stator core is generally configured by laminating a large number of thin steel plates and bonding the result with an adhesive or the like. In general, the stator core includes teeth around which windings are wound, and a core back that holds the teeth. When the rotating electrical machine is driven, a temperature increases toward the tip side of the teeth around which the windings are wound. In addition, in the stator core formed by laminating a large number of thin steel plates, deformation such as turning up of the thin steel plates due to contact with a jig or the like at the time of conveyance, shrink fitting to a housing, or the like must be taken into consideration.

PTL 1 describes that thin plates of a stator core are bonded to each other only at a core outer peripheral edge portion with an adhesive, and an adhesive that has permeated into the core from at least one of the outer peripheral surface and the inner peripheral surface of the core is used to bond the thin plates to each other.

CITATION LIST

Patent Literature

PTL 1: JP 2003-324869 A

SUMMARY OF INVENTION

Technical Problem

The technique described in PTL 1 cannot effectively cool the stator core and prevent deformation of the stator core.

Solution to Problem

A stator core of a rotating electrical machine according to the present invention is a stator core of a rotating electrical machine in which a core back and teeth are formed by laminating a plurality of thin steel plates with an adhesive interposed therebetween. The stator core includes a first stator core that is formed by applying the adhesive to a first region covering the core back and the teeth between the plurality of thin steel plates, and a second stator core that is formed by applying the adhesive to a second region, which has an area smaller than an area of the first region, between the plurality of thin steel plates. The first stator core is disposed at least at one end of the stator core in a laminating direction of the thin steel plates.

Advantageous Effects of Invention

According to the present invention, it is possible to effectively cool the stator core and prevent deformation of the stator core.

DESCRIPTION OF EMBODIMENTS

Figure 1:
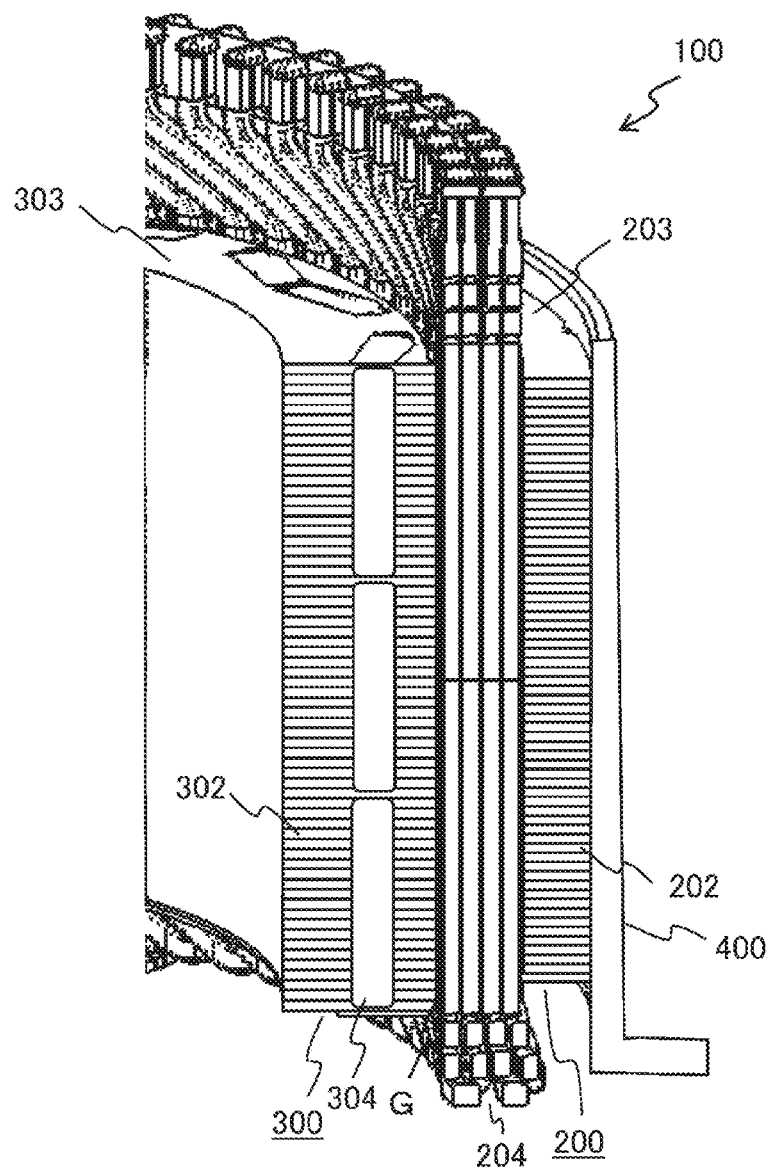
FIG. 1 is a cross-sectional perspective view of a rotating electrical machine.

Hereinafter, embodiments of the present invention will be described with reference to the drawings. The following description and drawings are examples for describing the present invention, and are omitted and simplified as appropriate for the sake of clarity of description. The present invention can be carried out in various other forms. Unless otherwise specified, each component may be singular or plural.

The position, size, shape, range, and the like of each component illustrated in the drawings may not represent the actual position, size, shape, range, and the like in order to facilitate understanding of the invention. Therefore, the present invention is not necessarily limited to the position, size, shape, range, and the like disclosed in the drawings.

FIG. 1 is a cross-sectional perspective view of a rotating electrical machine 100.

The rotating electrical machine 100 includes a stator 200 and a rotor 300 that rotates about a rotation axis, and is housed in a housing 400. The stator 200 is fixed to the housing 400, the rotor 300 rotates about a shaft (not illustrated), and the stator 200 and the rotor 300 are separated by a gap G which is a slight gap.

The stator 200 includes a stator core 203 formed by laminating a plurality of thin steel plates 202. Although details will be described later, each thin steel plate 202 integrally includes teeth T on the inner diameter side of the stator 200 and a core back C on the outer diameter side of the stator 200. In the stator core 203 formed by laminating the plurality of thin steel plates 202, windings 204 are wound around the teeth T. The rotor 300 includes a rotor core 303 formed by laminating a plurality of thin steel plates 302. A permanent magnet 304 is built in the rotor core 303.

Figure 2:
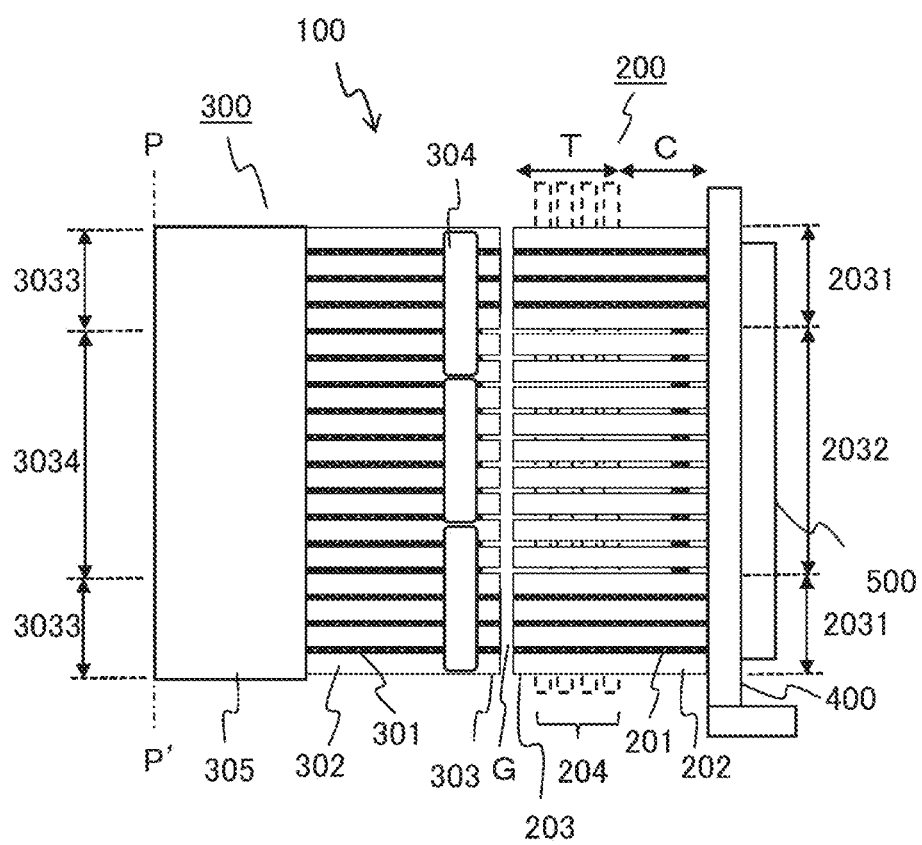
FIG. 2 is a cross-sectional view of the rotating electrical machine.

FIG. 2 is a cross-sectional view of the rotating electrical machine 100. This cross-sectional view is a cross section in a direction along the rotation axis of the rotating electrical machine 100, and illustrates a cross section on one side from a center P-P' of a shaft 305 which is the rotation axis.

The rotating electrical machine 100 includes the stator 200 and the rotor 300 that rotates about the shaft 305, and is housed in the housing 400. A cooler 500 is brought into contact with at least a part of the outer periphery of the housing 400 to cool heat generation of the rotating electrical machine 100.

The stator core 203 is formed by laminating the plurality of thin steel plates 202 with an adhesive 201 interposed therebetween. The stator core 203 includes a first stator core 2031 formed by applying the adhesive 201 to a first region covering the core back C and the teeth T between the plurality of thin steel plates 202, and a second stator core 2032 formed by applying the adhesive 201 to a second region having an area smaller than that of the first region between the plurality of thin steel plates 202. FIG. 2 illustrates an example in which the first stator cores 2031 are provided at both ends of the stator core 203 in the direction along the rotation axis. In the first stator core 2031, four thin steel plates 202 are bonded to the first region with the adhesive 201. In the second stator core 2032, the adhesive 201 is applied to and bonded to the second region which is a part of the core back C. In the example illustrated in FIG. 2, the teeth T are provided with gaps without the adhesive 201 between the laminated thin steel plates 202 (hereinafter, a core tip portion).

The rotor 300 includes the rotor core 303 formed by laminating the plurality of thin steel plates 302 with an adhesive 301 interposed therebetween. The permanent magnet 304 is built in the rotor core 303, and the rotor core 303 is fixed to the shaft 305.

The rotor core 303 includes a third rotor core 3033 formed by applying the adhesive 301 to a third region between the plurality of thin steel plates 302, and a fourth rotor core 3034 formed by applying the adhesive 301 to a fourth region having an area smaller than that of the third region between the plurality of thin steel plates 302. FIG. 2 illustrates an example in which the third rotor cores 3033 are provided at both ends of the rotor core 303 in the direction along the rotation axis. In the third rotor core 3033, four thin steel plates 302 are bonded to the third region with the adhesive 301. In the fourth rotor core 3034, the adhesive 301 is applied to the fourth region, and in the example illustrated in FIG. 2, a gap is provided without the adhesive 301 between the laminated thin steel plates 302 from the portion related to the permanent magnet 304 to the portion (hereinafter, a core tip portion) related to the gap G.

The thin steel plates 202 and 302 have a thickness of, for example, 0.15 mm to 0.5 mm. The adhesives 201 and 301 have, for example, a thickness of 1.5 μm to 5 μm. As a result, the core tip portion also has a gap of 1.5 μm to 5 μm. As the adhesives 201 and 301, acrylic-based adhesives, acrylate-based adhesives, epoxy-based adhesives, polyester-based adhesives, and the like are used in accordance with a heat-resistant temperature.

When the rotating electrical machine 100 is driven, the temperature of the stator core 203 increases toward the tip side of the tooth T around which the winding 204 is wound. Further, the temperature of the outer peripheral portion of the rotor core 303 also increases. Although not illustrated, the rotating electrical machine 100 is filled with oil, and the oil also permeates the core tip portion due to a capillary phenomenon. Therefore, the oil also flows from the gap G to the core tip portion, and the heat of the portion that becomes a high temperature can be conducted to the cooler 500 through the core back C side, so as to be cooled. In other words, in the tooth T of the stator core 203 and the permanent magnet 304 of the rotor core 303 having the highest heat generation temperature, the internal cooling effect of the rotating electrical machine 100 can be enhanced by increasing the surface areas of the thin steel plates 202 and 302 in contact with the oil. The second stator core 2032 has been described as an example in which a gap is provided at the core tip portion, that is, on the inner diameter side, but a gap may be provided on the outer diameter side. When a gap is provided on the outer diameter side, the outer diameter side can be actively cooled. Incidentally, although the example of oil has been described as a refrigerant, the same effect can be obtained in the case of air.

In the stator core 203 and the rotor core 303 formed by laminating a large number of thin steel plates 202 and 302, deformation such as turning up of the thin steel plates 202 and 302 due to contact with a jig or the like at the time of conveyance, shrink fitting to a housing, or the like must be taken into consideration. The deformation of the thin steel plates 202 and 302 frequently occurs in the thin steel plates 202 and 302 disposed near both ends of the stator core 203 and the rotor core 303 in the direction along the rotation axis of the rotor 300. In the present embodiment, the first stator core 2031 and the third rotor core 3033 are disposed at both ends in the direction along the rotation axis of the rotor 300. In the first stator core 2031 and the third rotor core 3033, since the adhesives 201 and 301 are applied to a wide region of the thin steel plates 202 and 302, the thin steel plates 202 and 302 are firmly held, and the deformation of the thin steel plates 202 and 302 can be prevented. The number of the thin steel plates 202 and 302 of the first stator core 2031 and the third rotor core 3033 is preferably two or more. In addition, the first stator core 2031 and the third rotor core 3033 are not limited to both ends in the direction along the rotation axis of the rotor 300, and may be disposed on one end side to which an external force or the like is likely to be applied. On the other hand, in the second stator core 2032 and the fourth rotor core 3034 disposed at the central portion in the direction along the rotation axis of the rotor 300, the gaps not applied with the adhesives 201 and 301 are provided at the core tip portions of the thin steel plates 202 and 302, and thus the inside of the rotating electrical machine 100 which tends to have a high temperature can be effectively cooled as described above.

Incidentally, the stator core 203 can be similarly applied to a core with a mounting hole of a bolt. Furthermore, the thin steel plates 202 and 302 further adopt thin plates for reducing iron loss due to the demand for a high-efficiency motor, but can be similarly applied to ultra-thin cores.

Figure 3:
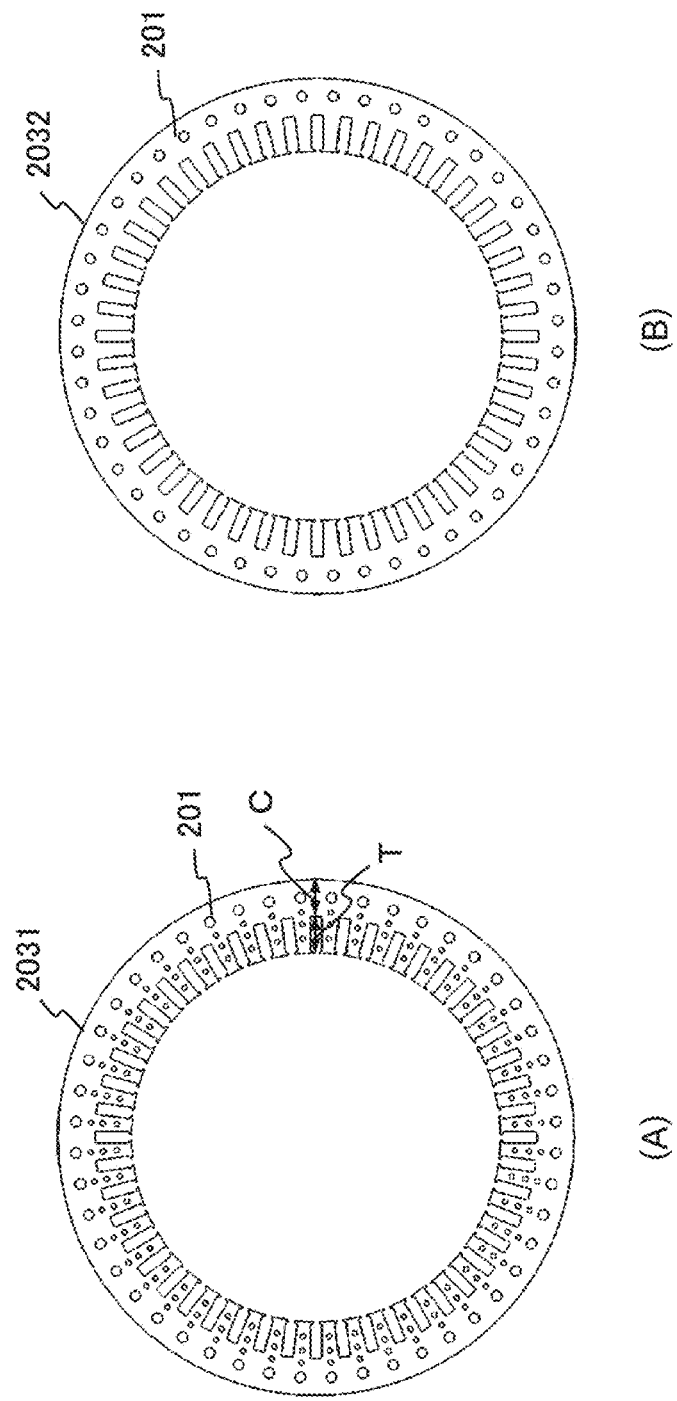
FIGS. 3(A) and 3(B) are top views of a first stator core and a second stator core in a first example.

FIGS. 3(A) and 3(B) are top views of a single thin steel plate of the first stator core 2031 and the second stator core 2032 in a first example.

As illustrated in FIG. 3(A), in the first stator core 2031, the adhesive 201 is applied to the first region covering the teeth T and the core back C. The adhesive 201 is applied in a spot manner over the teeth T and the core back C as indicated by white circles in the drawing.

On the other hand, as illustrated in FIG. 3(B), in the second stator core 2032, the adhesive 201 is applied to the second region which is the core back C and has an area smaller than that of the first region. The adhesive 201 is applied in a spot manner as indicated by white circles in the drawing. As indicated by white circles in the drawing, the adhesive 201 is applied in a spot manner at equal intervals along the circumference of the core back C.

Figure 4:
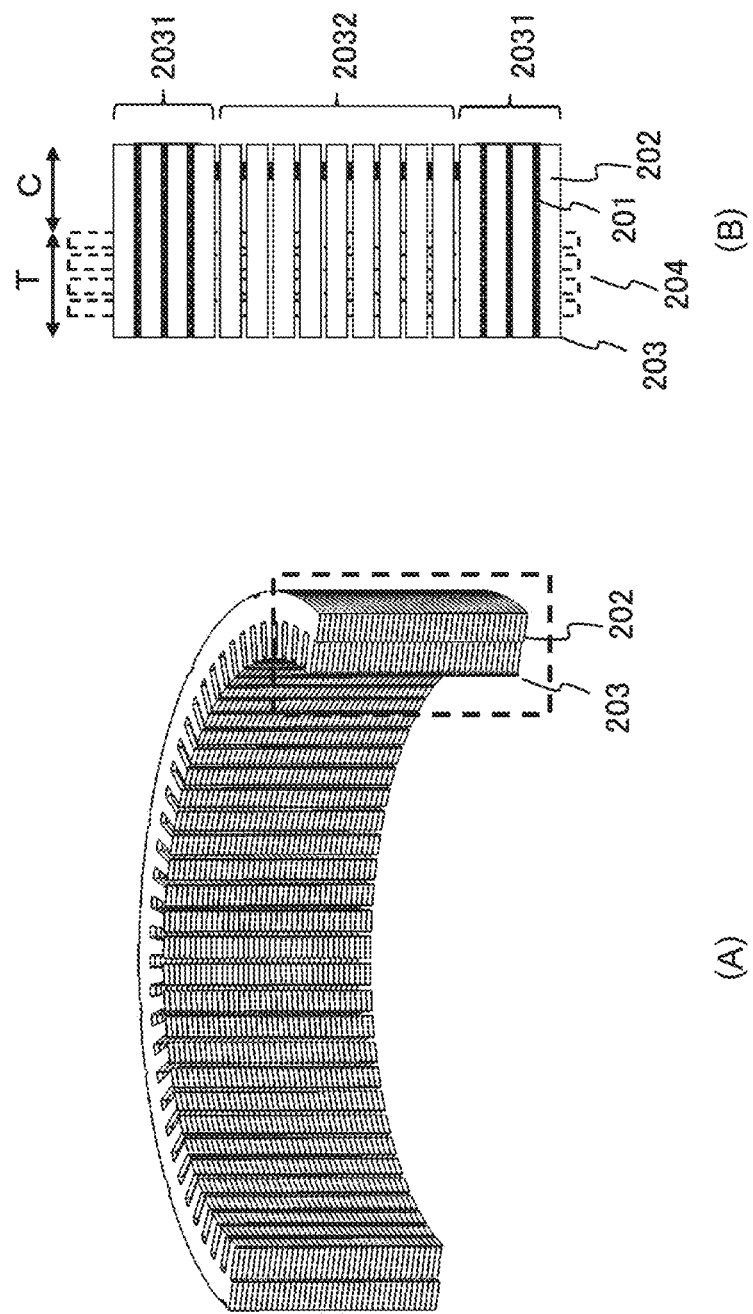
FIGS. 4(A) and 4(B) are a cross-sectional perspective view and a cross-sectional view of a stator core in the first example.

FIGS. 4(A) and 4(B) are a cross-sectional perspective view of the stator core 203 and a cross-sectional view of the stator core 203 in the first example. Incidentally, although the housing 400 and the cooler 500 are not illustrated, the stator core 203 is housed together with the rotor 300 in the housing 400, and the cooler 500 is in contact with at least a part of the outer periphery of the housing 400 as in FIG. 2.

FIG. 4(A) illustrates the semicircular stator core 203 formed by laminating a large number of thin steel plates 202. FIG. 4(B) is a cross-sectional view of a portion surrounded by a dotted line in FIG. 4(A). The stator core 203 configures the first stator core 2031 and the second stator core 2032 by laminating the thin steel plates illustrated in FIGS. 3(A) and 3(B). As illustrated in FIG. 4(B), the first stator cores 2031 are disposed at both ends of the stator core 203 in the direction along the rotation axis, and the second stator core 2032 is disposed at the central portion.

In the first example illustrated in FIGS. 3(A), 3(B), 4(A), and 4(B), since the adhesive 201 is applied in a spot manner, the refrigerant easily permeates, and there is an effect of excellent cooling performance.

Figure 5:
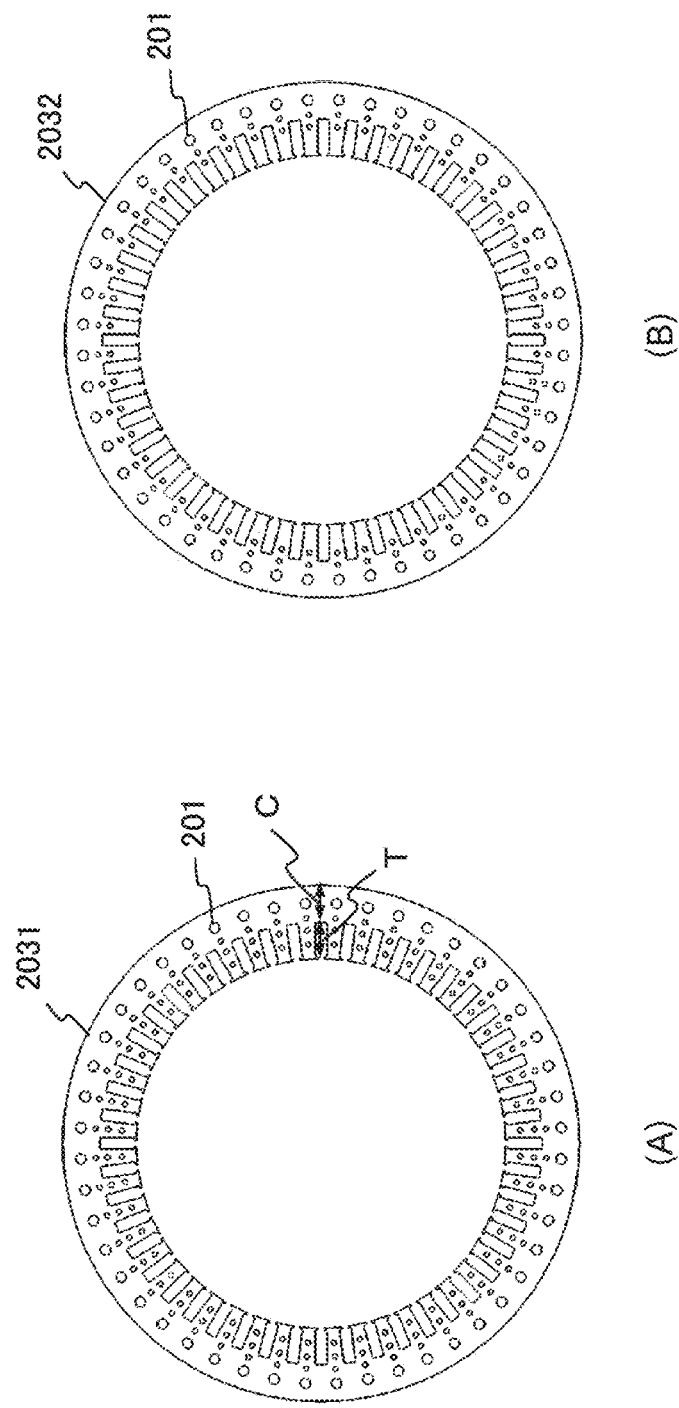
FIGS. 5(B) and 5(B) are top views of the first stator core and the second stator core in a second example.

FIGS. 5(B) and 5(B) are top views of a single thin steel plate of the first stator core 2031 and the second stator core 2032 in the second example.

As illustrated in FIG. 5(A), in the first stator core 2031, the adhesive 201 is applied to the first region covering the teeth T and the core back C. The adhesive 201 is applied in a spot manner over the teeth T and the core back C as indicated by white circles in the drawing.

On the other hand, as illustrated in FIG. 5(B), in the second stator core 2032, the adhesive 201 is applied to the second region which is the core back C and has an area smaller than that of the first region. As indicated by white circles in the drawing, the adhesive 201 is applied in a spot manner at equal intervals along the circumference of the core back C, and the adhesive less than the adhesive applied to the first stator core 2031 illustrated in FIG. 5(A) is applied to the teeth T side. Specifically, as will be described later, the adhesive 201 is applied in a spot manner up to a portion of the teeth T around which the winding 204 is wound.

Figure 6:
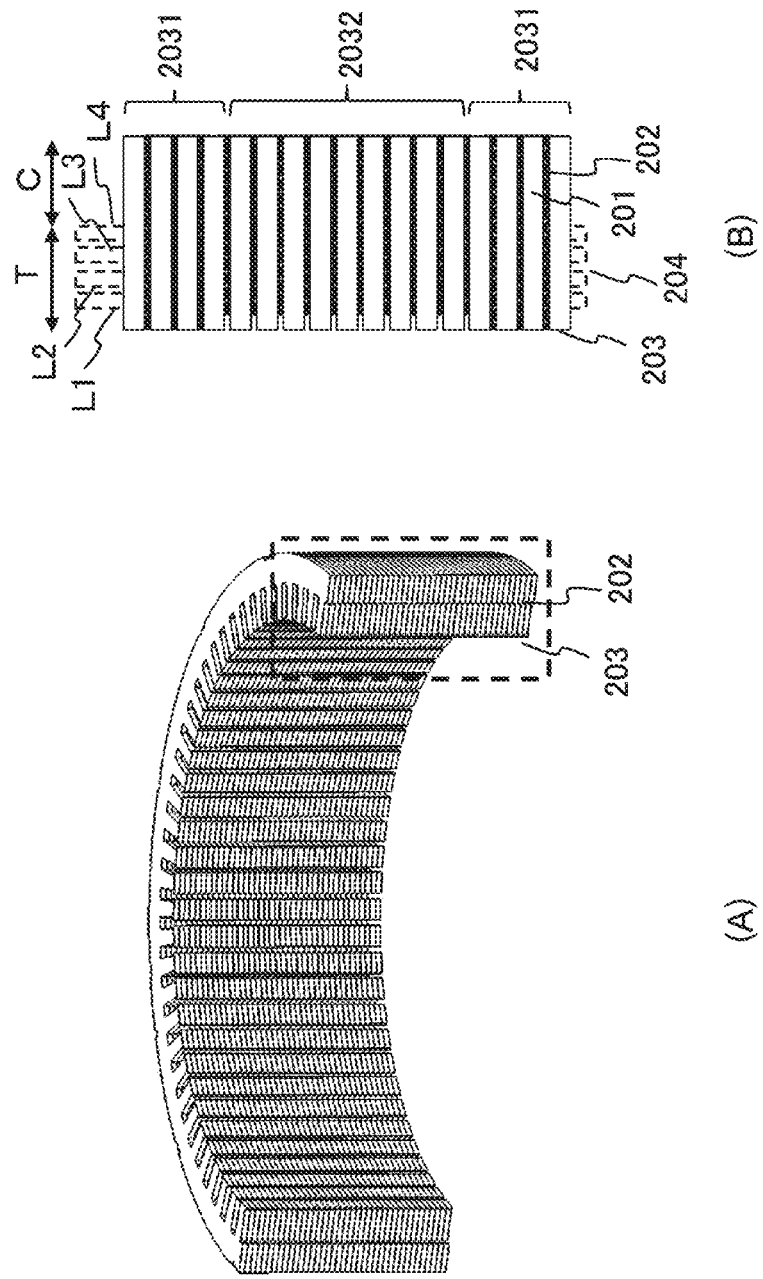
FIGS. 6(A) and 6(B) are a cross-sectional perspective view and a cross-sectional view of the stator core in the second example.

FIGS. 6(A) and 6(B) are a cross-sectional perspective view of the stator core 203 and a cross-sectional view of the stator core 203 in the second example. Incidentally, although the housing 400 and the cooler 500 are not illustrated, the stator core 203 is housed together with the rotor 300 in the housing 400, and the cooler 500 is in contact with at least a part of the outer periphery of the housing 400 as in FIG. 2.

FIG. 6(A) illustrates the semicircular stator core 203 formed by laminating a large number of thin steel plates 202. FIG. 6(B) is a cross-sectional view of a portion surrounded by a dotted line in FIG. 6(A). The stator core 203 configures the first stator core 2031 and the second stator core 2032 by laminating the thin steel plates 202 illustrated in FIGS. 5(A) and 5(B). As illustrated in FIG. 6(B), the first stator cores 2031 are disposed at both ends of the stator core 203 in the direction along the rotation axis, and the second stator core 2032 is disposed at the central portion. Here, the adhesive 201 of the second stator core 2032 is applied up to a portion around which the coil L1, which is close to the tip of the tooth T, among the coil L1 to the coil L4 of the winding 204 is wound.

In the second example illustrated in FIGS. 5(A), 5(B), 6(A), and 6(B), since the adhesive 201 is applied in a spot manner, the refrigerant easily permeates, and there is an effect of excellent cooling performance. In particular, in the tips of the teeth T of the second stator core 2032 disposed in the central portion, a gap is secured between the thin steel plates 202, and thus it is possible to effectively cool the portion having the highest temperature. In addition, conventionally, there is a problem that in a case where the winding 204 is sequentially wound from the inner diameter side of the stator core 203, the interval between the thin steel plates 202 at the tooth T portion narrows in the axial direction of the rotor 300, and conversely, an interval between the thin steel plates 202 on the outer diameter side of the stator core 203 widens in the axial direction. However, according to the second example described above, the adhesive 201 is applied up to the portion covered by the winding 204, and thus the conventional problem can be prevented.

Figure 7:
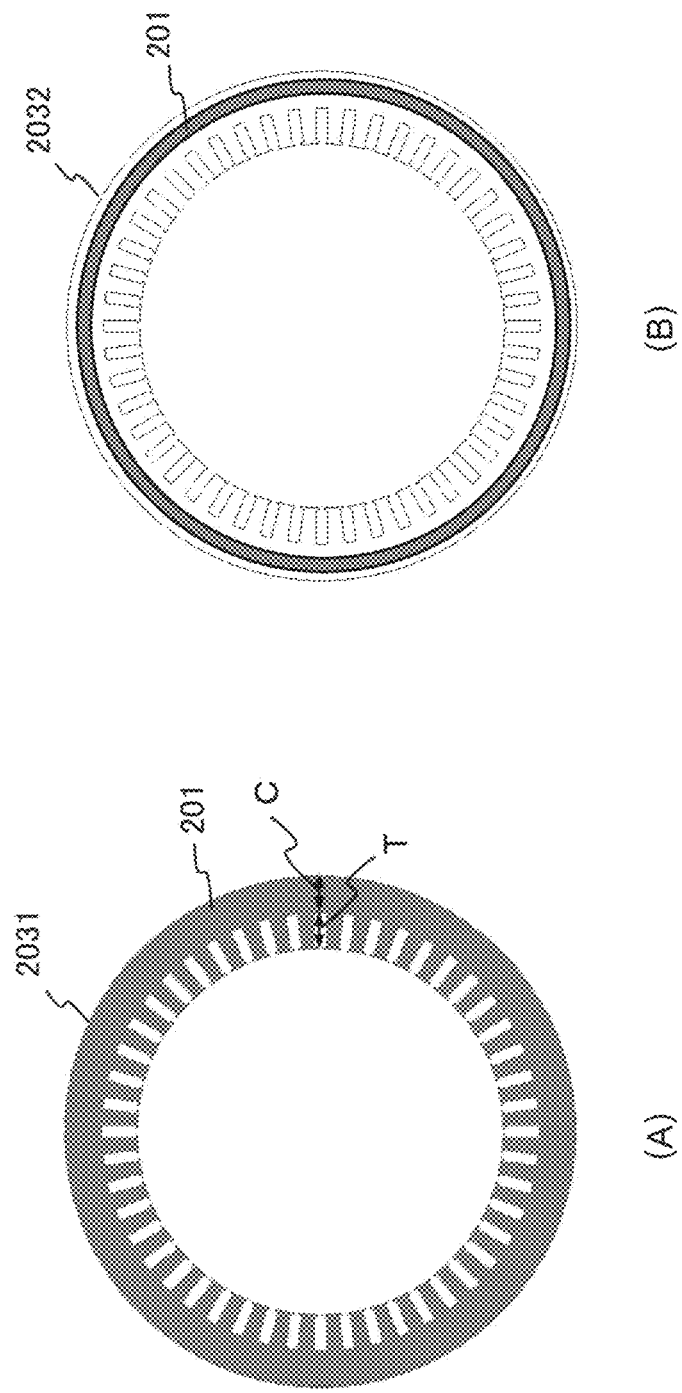
FIGS. 7(A) and 7(B) are top views of the first stator core and the second stator core in a third example.

FIGS. 7(A) and 7(B) are top views of a single thin steel plate of the first stator core 2031 and the second stator core 2032 in the third example.

As illustrated in FIG. 7(A), in the first stator core 2031, the adhesive 201 is applied to the first region covering the teeth T and the core back C. In the adhesive 201, as indicated by gray in the drawing, the entire region of the teeth T and the core back C serves as the first region.

On the other hand, as illustrated in FIG. 7(B), in the second stator core 2032, the adhesive 201 is applied to the second region which is the core back C and has an area smaller than that of the first region. As indicated by gray in the drawing, the adhesive 201 is applied to a part of the core back C in an annular shape along the circumference.

Figure 8:
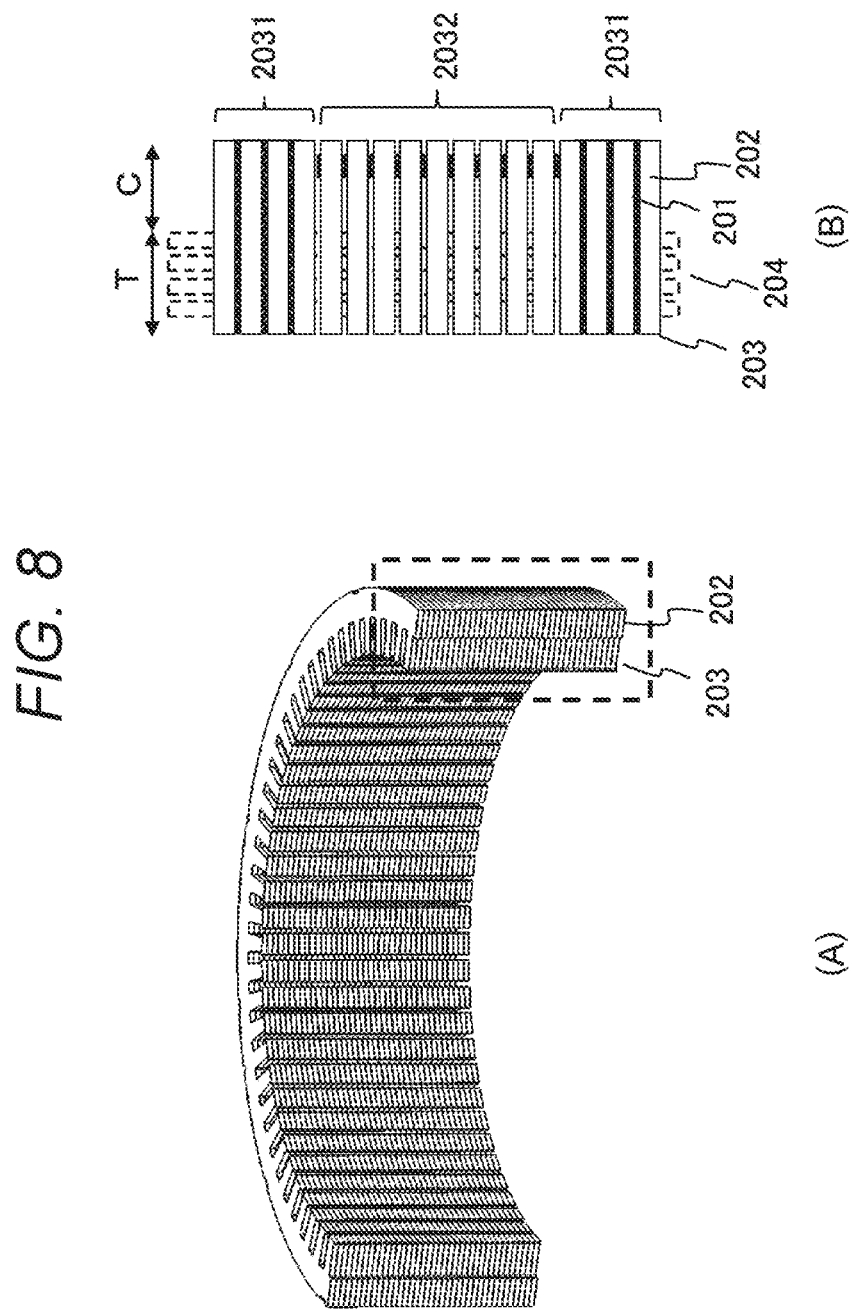
FIGS. 8(A) and 8(B) are a cross-sectional perspective view and a cross-sectional view of the stator core in the third example.

FIGS. 8(A) and 8(B) are a cross-sectional perspective view of the stator core 203 and a cross-sectional view of the stator core 203 in the third example. Incidentally, although the housing 400 and the cooler 500 are not illustrated, the stator core 203 is housed together with the rotor 300 in the housing 400, and the cooler 500 is in contact with at least a part of the outer periphery of the housing 400 as in FIG. 2.

FIG. 8(A) illustrates the semicircular stator core 203 formed by laminating a large number of thin steel plates 202. FIG. 8(B) is a cross-sectional view of a portion surrounded by a dotted line in FIG. 8(A). The stator core 203 configures the first stator core 2031 and the second stator core 2032 by laminating the thin steel plates 202 illustrated in FIGS. 7(A) and 7(B). As illustrated in FIG. 8(B), the first stator cores 2031 are disposed at both ends of the stator core 203 in the direction along the rotation axis, and the second stator core 2032 is disposed at the central portion.

In the third example illustrated in FIGS. 7(A), 7(B), 8(A), and 8(B), in the first stator core 2031, application is made on the entire region of the teeth T and the core back C, and in the second stator core 2032, application is made in an annular shape on a part of the core back C, so that the stator core 203 can be strengthened. Further, in the teeth T of the second stator core 2032 disposed in the central portion, a gap is secured between the thin steel plates 202, so that it is possible to effectively cool the portion having the highest temperature.

Figure 9:
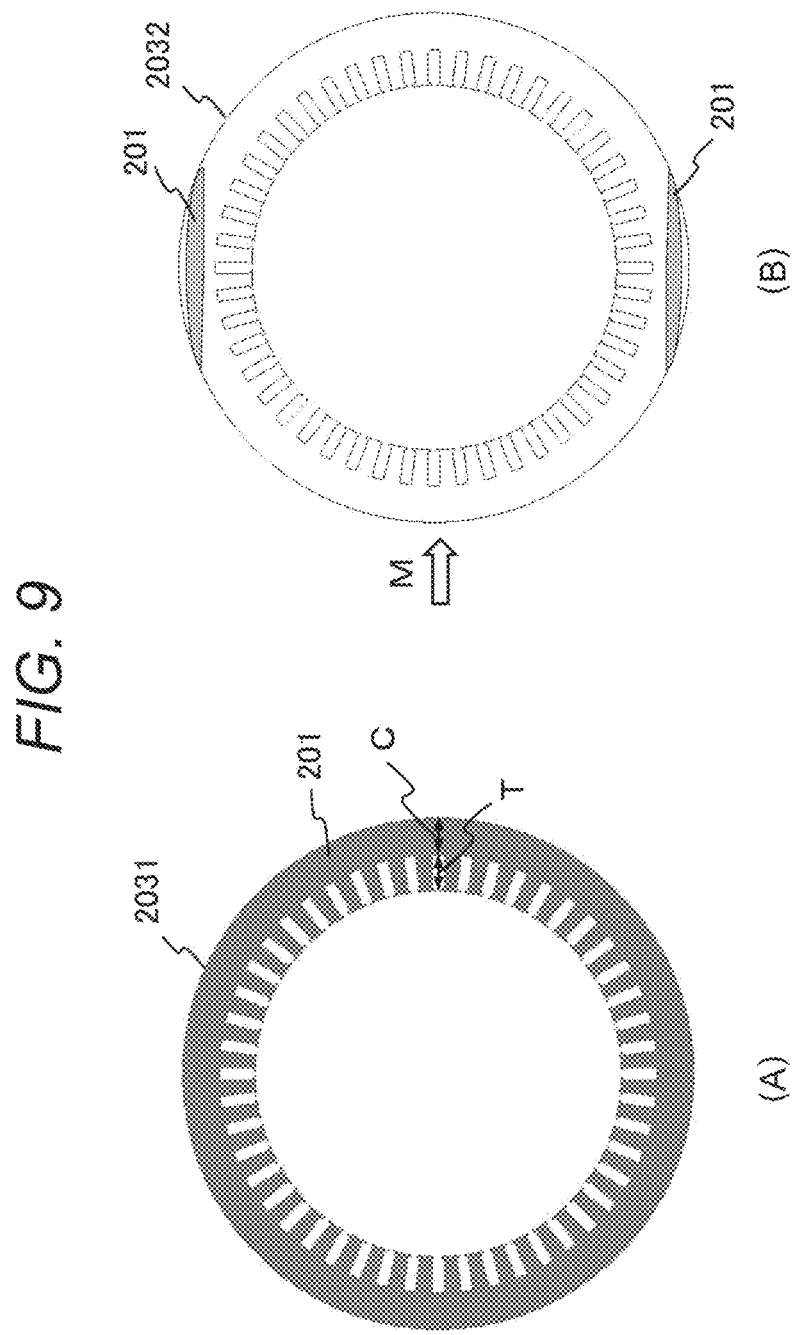
FIGS. 9(A) and 9(B) are top views of the first stator core and the second stator core in a fourth example.

FIGS. 9(A) and 9(B) are top views of a single thin steel plate of the first stator core 2031 and the second stator core 2032 in a fourth example.

As illustrated in FIG. 9(A), in the first stator core 2031, the adhesive 201 is applied to the first region covering the teeth T and the core back C. In the adhesive 201, as indicated by gray in the drawing, the entire region of the teeth T and the core back C serves as the first region.

On the other hand, as illustrated in FIG. 9(B), in the second stator core 2032, the adhesive 201 is applied to the second region which is the core back C and has an area smaller than that of the first region. As indicated by gray in the drawing, in a process of applying the adhesive 201 to the core back C, the adhesive 201 is linearly applied to both ends of the core back along a direction M in which the core back C is transferred.

Figure 10:
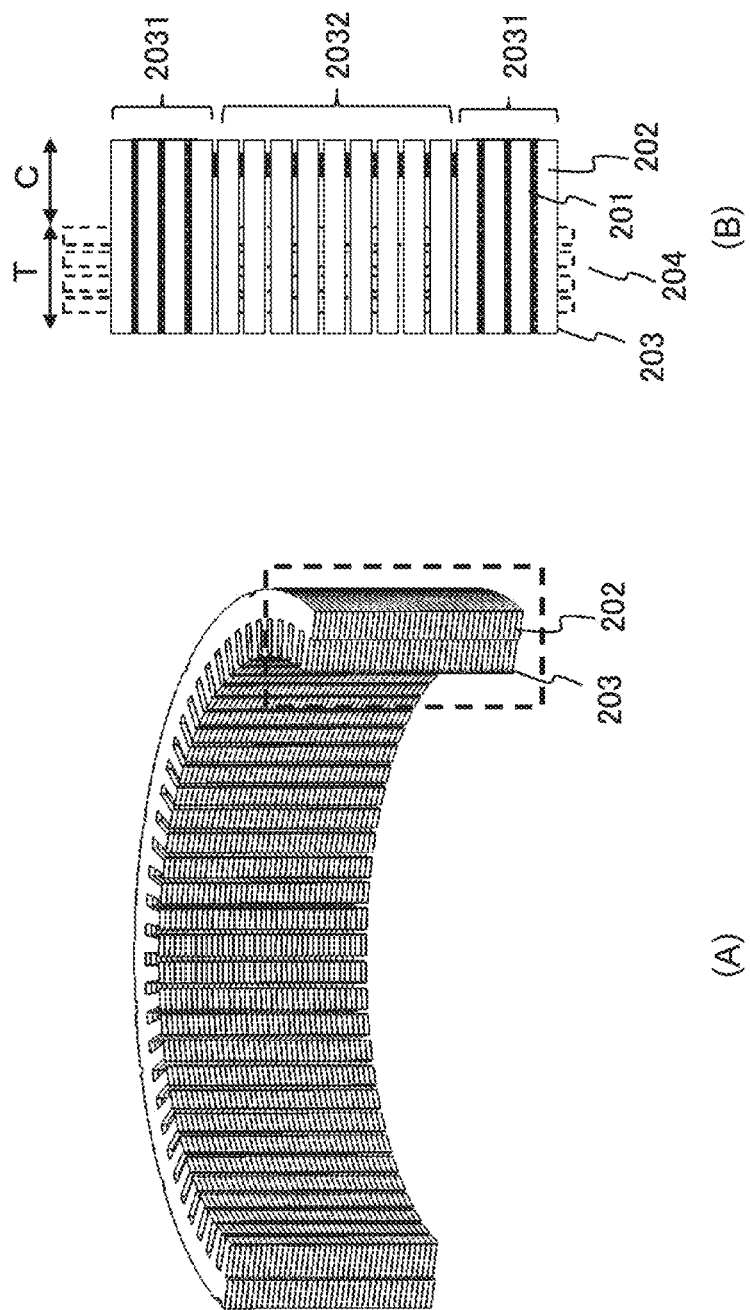
FIGS. 10(A) and (B) are a cross-sectional perspective view and a cross-sectional view of the stator core in the fourth example.

FIGS. 10(A) and 10(B) are a cross-sectional perspective view of the stator core 203 and a cross-sectional view of the stator core 203 in the fourth example. Incidentally, although the housing 400 and the cooler 500 are not illustrated, the stator core 203 is housed together with the rotor 300 in the housing 400, and the cooler 500 is in contact with at least a part of the outer periphery of the housing 400 as in FIG. 2.

FIG. 10(A) illustrates the semicircular stator core 203 formed by laminating a large number of thin steel plates 202. FIG. 10(B) is a cross-sectional view of a portion surrounded by a dotted line in FIG. 10(A). The stator core 203 configures the first stator core 2031 and the second stator core 2032 by laminating the thin steel plates 202 illustrated in FIGS. 9(A) and 9(B). As illustrated in FIG. 10(B), the first stator cores 2031 are disposed at both ends of the stator core 203 in the direction along the rotation axis, and the second stator core 2032 is disposed at the central portion.

In the fourth example illustrated in FIGS. 9(A), 9(B), 10(A), and 10(B), the application process of the adhesive 201 in the second stator core 2032 can be simplified. In addition, in the first stator core 2031, application is made on the entire region of the teeth T and the core back C, and in the second stator core 2032, application is made linearly on both ends of the core back C, so that the stator core 203 can be strengthened. Further, a gap is secured between the thin steel plates 202 of the second stator core 2032 disposed in the central portion, so that it is possible to effectively cool the portion having the highest temperature.

Figure 11:
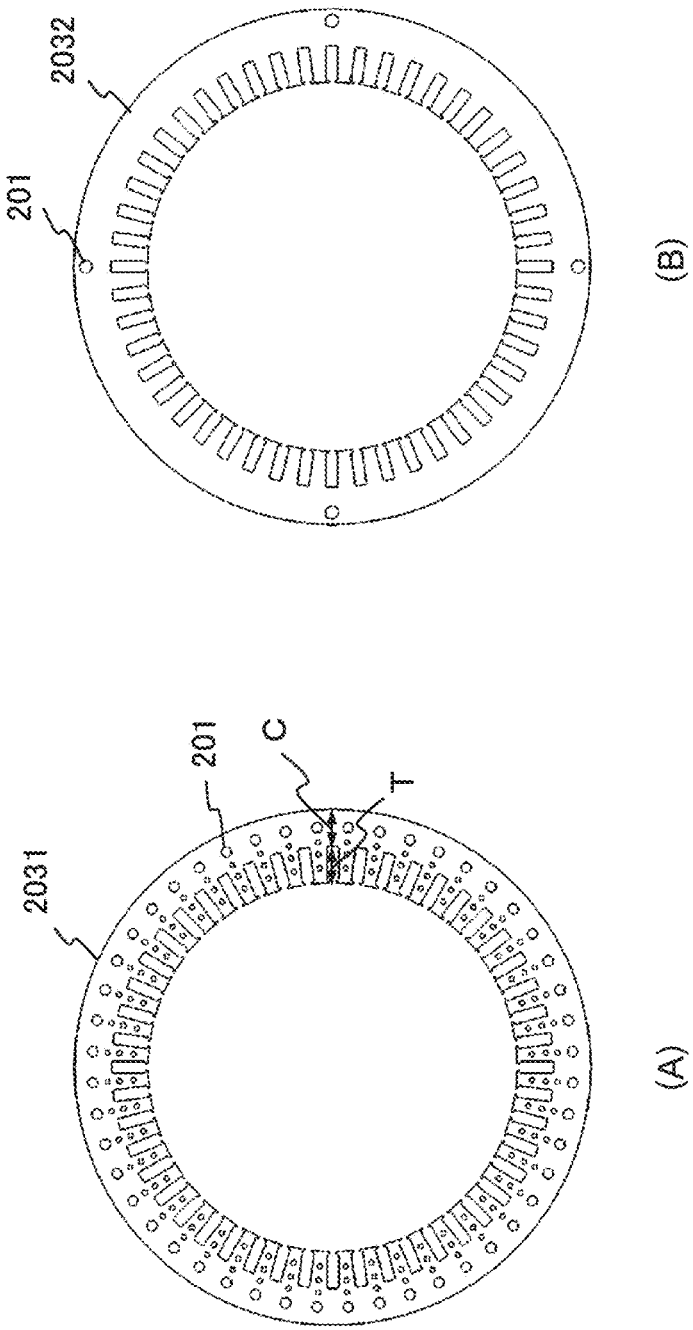
FIGS. 11(A) and (B) are top views of the first stator core and the second stator core in a fifth example.

FIGS. 11(A) and 11(B) are top views of a single thin steel plate of the first stator core 2031 and the second stator core 2032 in a fifth example.

As illustrated in FIG. 11(A), in the first stator core 2031, the adhesive 201 is applied to the first region covering the teeth T and the core back C. The adhesive 201 is applied in a spot manner over the teeth T and the core back C as indicated by white circles in the drawing.

On the other hand, as illustrated in FIG. 11(B), in the second stator core 2032, the adhesive 201 is applied to the second region which is the core back C and has an area smaller than that of the first region. As indicated by white circles in the drawing, the adhesive 201 is applied in a spot manner at positions at intervals of 90° along the circumference of the core back C.

Figure 12:
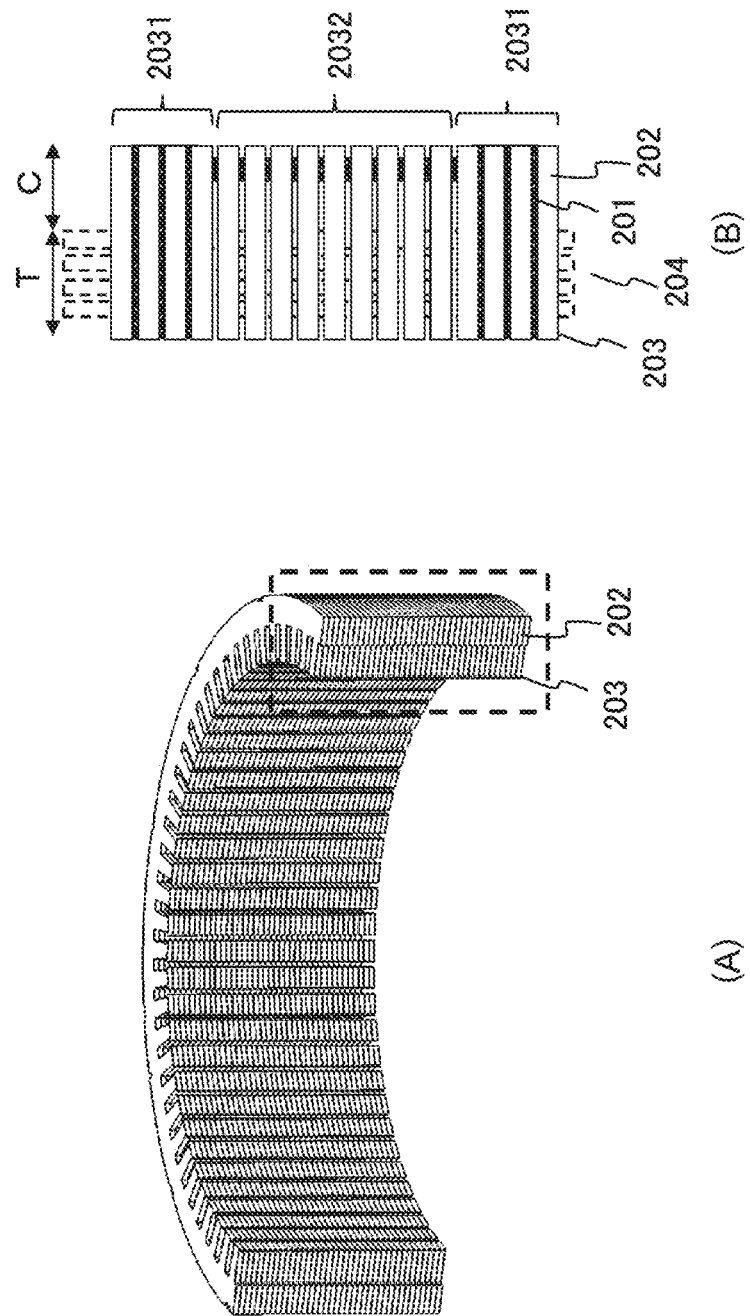
FIGS. 12(A) and (B) are a cross-sectional perspective view and a cross-sectional view of the stator core in the fifth example.

FIGS. 12(A) and 12(B) are a cross-sectional perspective view of the stator core 203 and a cross-sectional view of the stator core 203 in the fifth example. Incidentally, although the housing 400 and the cooler 500 are not illustrated, the stator core 203 is housed together with the rotor 300 in the housing 400, and the cooler 500 is in contact with at least a part of the outer periphery of the housing 400 as in FIG. 2.

FIG. 12(A) illustrates the semicircular stator core 203 formed by laminating a large number of thin steel plates 202. FIG. 12(B) is a cross-sectional view of a portion surrounded by a dotted line in 12(A). The stator core 203 configures the first stator core 2031 and the second stator core 2032 by laminating the thin steel plates illustrated in FIGS. 11(A) and 11(B). As illustrated in FIG. 12(B), the first stator cores 2031 are disposed at both ends of the stator core 203 in the direction along the rotation axis, and the second stator core 2032 is disposed at the central portion.

In the fifth example illustrated in FIGS. 11(A), 11(B), 12(A), and 12(B), since the adhesive 201 is applied in a spot manner, the refrigerant easily permeates, and there is an effect of excellent cooling performance. In particular, in the second stator core 2032, the refrigerant easily permeates to the core back C, and the cooling performance is excellent.

Figure 13:
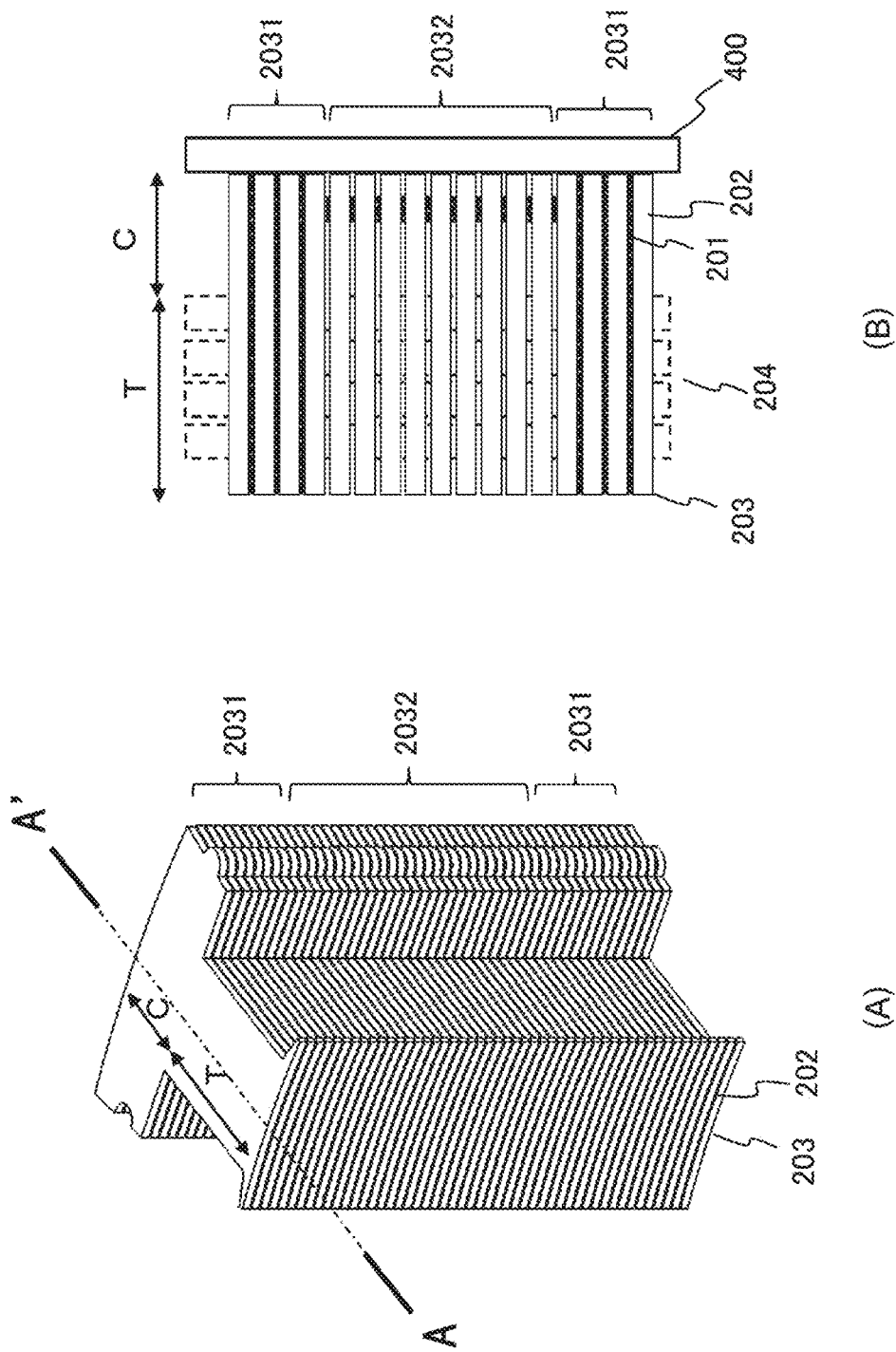
FIGS. 13(A) and (B) are a cross-sectional perspective view and a cross-sectional view of the stator core in a sixth example.

FIGS. 13(A) and 13(B) are a cross-sectional perspective view of the stator core 203 and a cross-sectional view of the stator core 203 in a sixth example. Incidentally, although the cooler 500 is not illustrated, the stator core 203 is housed together with the rotor 300 in the housing 400, and the cooler 500 is in contact with at least a part of the outer periphery of the housing 400 as in FIG. 2.

FIG. 13(A) illustrates the separated stator core 203 for each tooth formed by laminating a large number of thin steel plates 202. FIG. 13(B) is a cross-sectional view taken along line A-A' of FIG. 13(A). The stator core 203 configures the first stator core 2031 and the second stator core 2032 by laminating thin steel plates. The separated stator cores 203 are annularly connected to form one stator core 203. In the stator core 203, the first stator cores 2031 are disposed at both ends in the direction along the rotation axis, and the second stator core 2032 is disposed at the central portion.

As illustrated in FIG. 13(B), in the first stator core 2031, for example, as illustrated in FIG. 3(A), the adhesive 201 is applied in a spot manner to the first region covering the teeth T and the core back C. Alternatively, as illustrated in FIG. 7(A), the adhesive 201 is applied to the entire region covering the teeth T and the core back C.

On the other hand, in the second stator core 2032, for example, as illustrated in FIG. 3(B), the adhesive 201 is applied in a spot manner to the second region which is the core back C and has an area smaller than that of the first region. Alternatively, as illustrated in FIG. 7(B), application is made annularly along the circumference on a second region which is the core back C and has an area smaller than that of the first region, specifically, a part of the core back C.

In the sixth example illustrated in FIGS. 13(A) and 13(B), a gap is secured between the thin steel plates 202 in the teeth T of the second stator core 2032 disposed in the central portion, so that it is possible to effectively cool the portion having the highest temperature.

Figure 14:
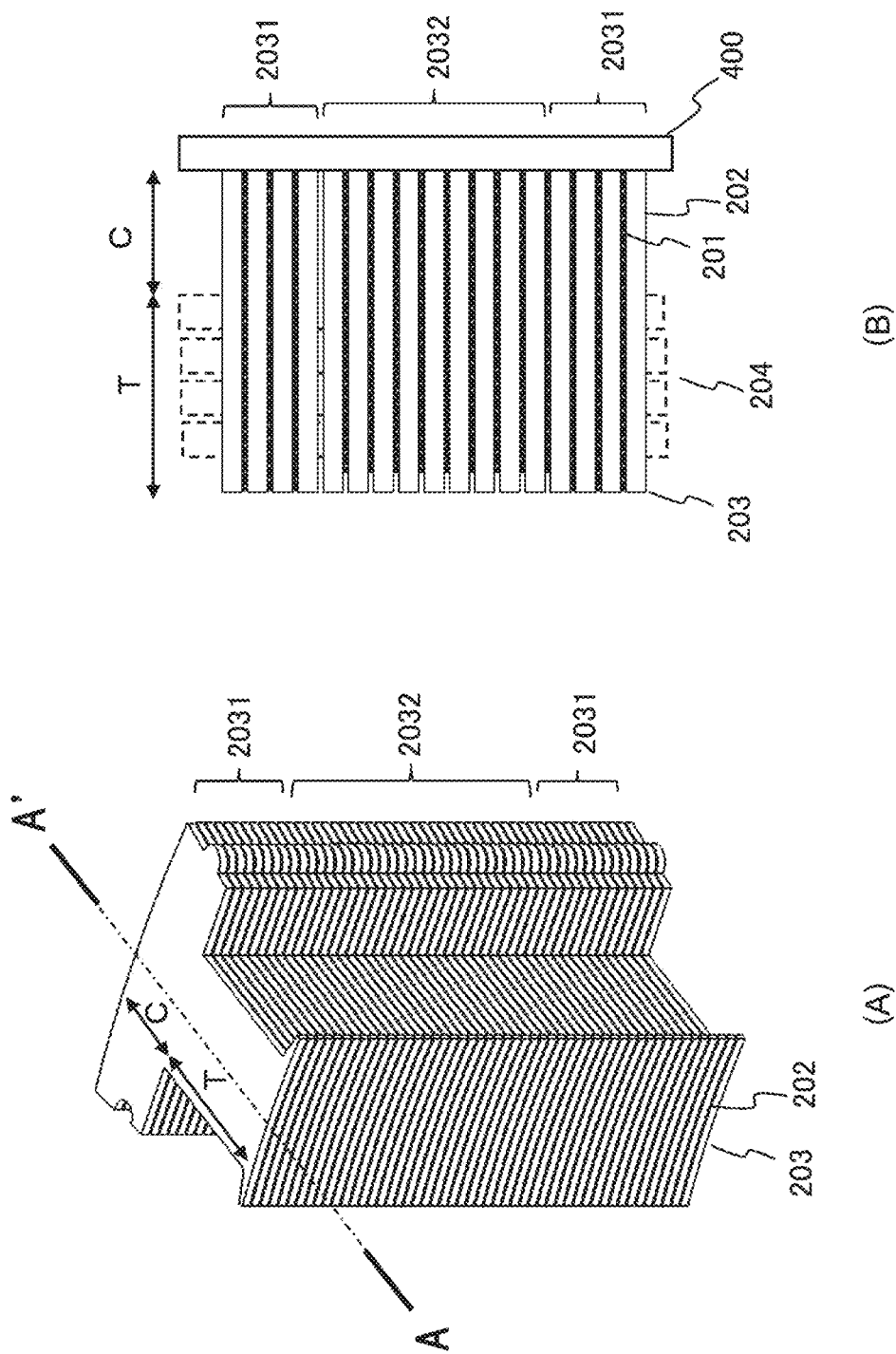
FIGS. 14(A) and (B) are a cross-sectional perspective view and a cross-sectional view of the stator core in a seventh example.

FIGS. 14(A) and 14(B) are a cross-sectional perspective view of the stator core 203 and a cross-sectional view of the stator core 203 in a seventh example. Incidentally, although the cooler 500 is not illustrated, the stator core 203 is housed together with the rotor 300 in the housing 400, and the cooler 500 is in contact with at least a part of the outer periphery of the housing 400 as in FIG. 2.

FIG. 14(A) illustrates the separated stator core 203 for each tooth formed by laminating a large number of thin steel plates 202. FIG. 14(B) is a cross-sectional view taken along line A-A' of FIG. 14(A). The stator core 203 configures the first stator core 2031 and the second stator core 2032 by laminating thin steel plates. In the stator core 203, the first stator cores 2031 are disposed at both ends in the direction along the rotation axis, and the second stator core 2032 is disposed at the central portion.

As illustrated in FIG. 14(B), in the first stator core 2031, for example, as illustrated in FIG. 5(A), the adhesive 201 is applied in a spot manner or entirely to the first region covering the teeth T and the core back C.

On the other hand, in the second stator core 2032, for example, as illustrated in FIG. 5(B), the adhesive 201 is applied to the second region which is the core back C and has an area smaller than that of the first region. Specifically, application is formed in a spot manner or entirely on the core back C, and application is formed in a spot manner or entirely, except for the tip portion of the tooth T, up to the portion of the tooth T around which the winding 204 is wound.

In the seventh example illustrated in FIGS. 14(A) and 14(B), a gap is secured between the thin steel plates 202 at the tip portions of the teeth T of the second stator core 2032 disposed in the central portion, so that it is possible to effectively cool the portion having the highest temperature. Further, the adhesive 201 is applied up to the portion covered by the winding 204, so that it is possible to prevent the tooth T portion from shrinking in the axial direction of the rotor 300 after the winding 204 is coil-wound.

Figure 15:
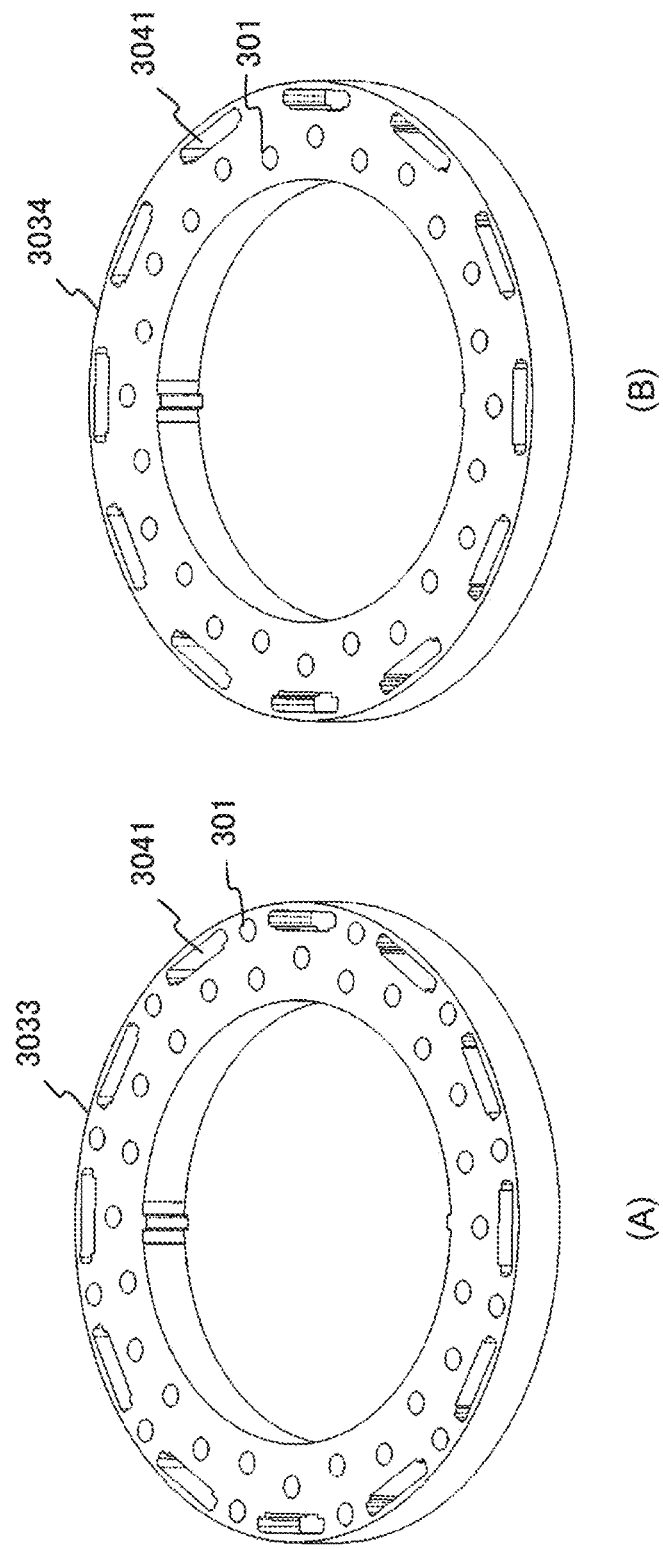
FIGS. 15(A) and (B) are perspective views of a third rotor core and a fourth rotor core.

FIGS. 15(A) and 15(B) are perspective views illustrating one thin steel plate 302 of the rotor core 303. FIG. 15(A) illustrates the third rotor core 3033, and FIG. 15(B) illustrates the fourth rotor core 3034.

As illustrated in FIG. 15(A), in the third rotor core 3033, the adhesive 301 is applied to the third region. Specifically, as indicated by white circles in the drawing, the adhesive 301 is applied in a spot manner at equal intervals to the inner diameter side and the outer shape side of the third rotor core 3033. Incidentally, the adhesive 301 may be applied to the entire region of the third rotor core 3033.

As illustrated in FIG. 15(B), in the fourth rotor core 3034, the adhesive 301 is applied to the fourth region narrower than the third region. Specifically, as indicated by white circles in the drawing, the adhesive 301 is applied in a spot manner at equal intervals to the inner diameter side of the third rotor core 3033. Incidentally, the adhesive 301 may be applied annularly to the inner diameter side of the third rotor core 3033.

Incidentally, the third rotor core 3033 and the fourth rotor core 3034 are provided with magnet holes 3041 into which the permanent magnets 304 are fitted.

Figure 16:
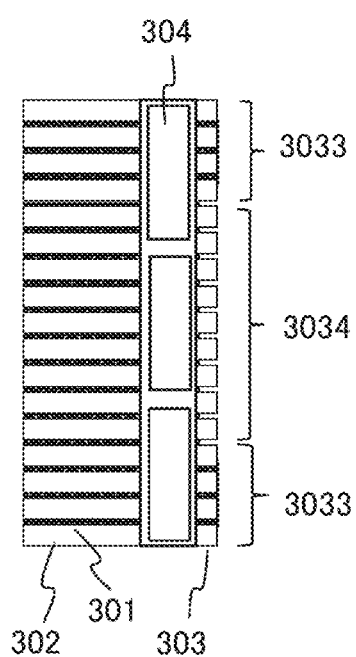
FIG. 16 is a cross-sectional view of a rotor core.

FIG. 16 is a cross-sectional view of the rotor core 303.

In the rotor core 303, the third rotor cores 3033 illustrated in FIG. 15(A) are disposed at both ends in the direction along the rotation axis of the rotor 300, and the fourth rotor core 3034 illustrated in FIG. 15(B) is disposed at the central portion in the direction along the rotation axis of the rotor 300.

In the third rotor core 3033, four thin steel plates 302 are bonded to the third region with the adhesive 301. In the fourth rotor core 3034, the adhesive 301 is applied to the fourth region, and in the example illustrated in FIG. 16, a gap is provided without the adhesive 301 between the laminated thin steel plates 302 in the core tip portion.

When the rotating electrical machine 100 is driven, the temperature of the permanent magnet 304 of the rotor core 303 also increases. Although not illustrated, the rotating electrical machine 100 is filled with a refrigerant, and the refrigerant also permeates the core tip portion of the fourth rotor core 3034 due to a capillary phenomenon. Therefore, the refrigerant also flows to the core tip portion, and heat of a portion that becomes high temperature can be conducted to perform cooling. By increasing the surface area of the thin steel plate 302 in contact with the refrigerant, the internal cooling effect of the rotating electrical machine 100 can be enhanced.

In addition, in the rotor core 303 formed by laminating a large number of thin steel plates 302, deformation such as turning up of the thin steel plates 302 due to contact with a jig or the like at the time of conveyance, shrink fitting to a housing, or the like must be taken into consideration. In the present embodiment, the third rotor cores 3033 are disposed at both ends in the direction along the rotation axis of the rotor 300. In the third rotor core 3033, since the adhesive 301 is applied to a wide region of the thin steel plate 302, the thin steel plate 302 is firmly held, and the deformation of the thin steel plate 302 can be prevented. The number of the thin steel plates 302 of the third rotor core 3033 is preferably two or more. In addition, the third rotor core 3033 is not limited to both ends in the direction along the rotation axis of the rotor 300, and may be disposed on one end side to which an external force or the like is likely to be applied. On the other hand, in the fourth rotor core 3034 disposed at the central portion in the direction along the rotation axis of the rotor 300, the gap not applied with the adhesive 301 is provided at the core tip portion of the thin steel: plate 302, and thus the inside of the rotating electrical machine 100 which tends to have a high temperature can be effectively cooled as described above.

According to the above-described embodiment, the following operational effects can be obtained.

(1) In the stator core 203 of the rotating electrical machine 100, the core back C and the teeth T are formed by laminating the plurality of thin steel plates 202 with the adhesive 201 interposed therebetween. The stator core 203 includes the first stator core 2031 that is formed by applying the adhesive 201 to the first region covering the core back C and the teeth T between the plurality of thin steel plates 202, and the second stator core 2032 that is formed by applying the adhesive 201 to the second region, which has an area smaller than an area of the first region, between the plurality of thin steel plates 202. The first stator core 2031 is disposed at least at one end of the stator core 203 in a laminating direction of the thin steel plates 202. As a result, it is possible to effectively cool the stator core and prevent the deformation of the stator core.

The present invention is not limited to the above-described embodiment, and other forms conceivable within the scope of the technical idea of the present invention are also included within the scope of the present invention as long as the features of the present invention are not impaired. In addition, the above-described embodiment and a plurality of examples may be combined.

REFERENCE SIGNS LIST 100 rotating electrical machine
200 stator
201, 301 adhesive
302 thin steel plate
203 stator core
204 winding
300 rotor
303 rotor core
304 permanent magnet
305 shaft
400 housing
2031 first stator core
2032 second stator core
3033 third rotor core
3034 fourth rotor core
G gap T teeth
C core back

The invention claimed is:

1. A stator core of a rotating electrical machine in which a core back and teeth are formed by laminating a plurality of thin steel plates with an adhesive interposed therebetween, wherein
the stator core includes
a first stator core that is formed by applying the adhesive to a first region covering the core back and the teeth between the plurality of thin steel plates, and
a second stator core that is formed by applying the adhesive to a second region, which has an area smaller than an area of the first region, between the plurality of thin steel plates, and
the first stator core is disposed at least at one end of the second stator core in a laminating direction of the thin steel plates.

2. The stator core of the rotating electrical machine according to claim 1, wherein the first stator core is disposed at both ends of the second stator core in the laminating direction of the thin steel plates.

3. The stator core of the rotating electrical machine according to claim 1, wherein
in the first stator core, the adhesive is applied in a spot manner to the first region covering the core back and the teeth, and
in the second stator core, the adhesive is applied in a spot manner to the second region covering the core back along a circumference of the core back.

4. The stator core of the rotating electrical machine according to claim 3, wherein in the second stator core, the adhesive is applied in a spot manner up to a portion of the teeth around which a winding is wound, the portion being the second region covering the core back and the teeth.

5. The stator core of the rotating electrical machine according to claim 1, wherein
in the first stator core, the adhesive is applied to the first region which is an entire region covering the core back and the teeth, and
in the second stator core, the adhesive is applied to the second region which is a region annularly covering a part of the core back along a circumference.

6. The stator core of the rotating electrical machine according to claim 1, wherein
in the first stator core, the adhesive is applied to the first region which is an entire region covering the core back and the teeth, and
in the second stator core, the adhesive is applied to the second region which is a region linearly covering both ends of the core back.

7. The stator core of the rotating electrical machine according to claim 1, wherein
in the first stator core, the adhesive is applied in a spot manner to the first region covering the core back and the teeth, and
in the second stator core, the adhesive is applied in a spot manner to the second region covering the core back at a position of 90 degrees along a circumference of the core back.

8. The stator core of the rotating electrical machine according to claim 1, wherein the first stator core and the second stator core are formed by annularly connecting separated stator cores of respective teeth.

9. A rotating electrical machine comprising:
the stator core of the rotating electrical machine according to claim 1; and
a rotor core formed by laminating a plurality of thin steel plates with the adhesive interposed therebetween, wherein
the rotor core includes
a third rotor core that is formed by applying the adhesive to a third region between the plurality of thin steel plates, and
a fourth rotor core that is formed by applying the adhesive to a fourth region, which has an area smaller than an area of the third region, between the plurality of thin steel plates, and
the third rotor core is disposed at least at one end of the rotor core in a laminating direction of the thin steel plates.

10. The rotating electrical machine according to claim 9, wherein in the rotor core,
the adhesive is applied to the third regions on an inner diameter side and an outer shape side of the third rotor core, and
the adhesive is applied to the fourth region on an inner diameter side of the fourth rotor core.

* * * * *